Inventors.
Anthony J. Rich
John S. Novak
By: Wallenstein, Spangenberg, Hattis & Strampel attys.

INFORMATION STORAGE AND PLAYBACK SYSTEM

Filed Oct. 24, 1965

Inventors
Anthony J. Rich
John S. Novak
By Wallenstein, Spangenberg, Hattis & Strampel Attys.

INFORMATION STORAGE AND PLAYBACK SYSTEM

Filed Oct. 24, 1965 Sheet 3 of 8

Inventors
Anthony J. Rich
John S. Novak
By Wegllenstein, Spangenberg, Hattis & Strampel Attys.

INFORMATION STORAGE AND PLAYBACK SYSTEM

Inventors:
Anthony J. Rich
John S. Novak
By: Wallenstein, Spangenberg, Hattis & Strampel Attys.

Inventors
Anthony J. Rich
John S. Novak
By: Wallenstein, Spangenberg, Hattis & Strampel Attys.

Inventors
Anthony J. Rich
John S. Novak
By: Wallenstein, Spangenberg, Hattis & Strampel
Attys

INFORMATION STORAGE AND PLAYBACK SYSTEM

Filed Oct. 24, 1965

Inventors
Anthony J. Rich
John S. Novak
By: Wallenstein, Spangenberg, Hattis & Strampel
Attys.

Inventors
Anthony J. Rich
John S. Novak
By: Wallenstein, Spangenberg, Hattis & Strampel Attys United States Patent Office 3,426,339
Patented Feb. 4, 1969

3,426,339
INFORMATION STORAGE AND PLAYBACK SYSTEM

Anthony J. Rich, Villa Park, and John S. Novak, Westchester, Ill., assignors to Rich Engineering Inc., Franklin, Park, Ill., a corporation of Illinois Filed Oct. 24, 1965, Ser. No. 504,682
U.S. Cl. 340—174.1 13 Claims
Int. Cl. G11b *5/00;* G09b *21/00*

ABSTRACT OF THE DISCLOSURE

An instruction system is provided for students situated at a number of student stations each having a magnetic tape recorder with controls for enabling each student to control completely his individual recorder under normal circumstances, and a common lesson storage station in which a multiplicity of lessons are stored on magnetic tape. Each student station includes lesson identifying controls which, when operated by a student will immediately initiate a high speed transfer of a lesson stored at the common lesson storage station if a lesson transfer operation is not in progress. If a lesson transfer operation is in progress when a student operates his lesson identifying controls, means are provided for memorizing all students calling for a particular lesson and, when the high speed lesson transfer operation involved is terminated, the selected lesson will automatically be transferred to the recorders at the student stations waiting for the transfer of the lesson involved. Student recorder inhibiting means are provided at each student station preventing the operation of a student recorder during the transfer of a lesson to the student recorder involved.

The present invention relates to educational equipment for storing and communicating pre-recorded information to individual student stations.

Languages are being taught in many schools with the aid of pre-recorded taped lesson programs which enable the student to progress at a speed dependent on his own ability. For reasons of economy and flexibility, a central magnet tape storage library has been proposed which stores a large number of individual lessons lasting 30 minutes or more on separate tapes or tracks, the tapes being mounted in a tape transport unit with plural outputs from which different lessons on the tape tracks can be played back simultaneously to various student booths or stations. Any lesson not in use on a separate tape can be selected by a student at a student station by controls which remotely control the tape transport unit. Sometimes provisions are made for remote student control of fast wind and rewind of the master tape so that the student can replay any section of the tape. In such case, only one student can have access and control of a given tape so that such a system would require separate tapes rather than a multi-track tape for each lesson to prevent one student from holding up for 30 minutes or more access to other lessons on the same tape. A similar problem exists if more than one student desires to use the same lesson since the second student would have to wait until the first student completed using the tape on which the lesson involved is recorded before he could have control over the same.

The present invention provides a unique and highly advantageous improvement over these prior lesson communicating systems in that any student can obtain complete access and playback control of any lesson on a tape track in the tape storage library without waiting more than a few minutes, so that more students can utilize to maximum benefit the lesson information stored in the tape library.

In accordance with the present invention, a simple two speed single track playback tape recorder is positioned at each student station and, instead of using the normal speed common tape transport unit at the tape storage library, the transport unit is designed to operate at a speed many times faster than normal, such as thirty inches per second as compared to the normal playback tape speed of one inch per second. The student station operates at both the thirty and one inch per second speeds. When the student desires a particular lesson, he operates lesson selector controls at his station which causes the common tape transport to transfer and record on the student's tape recorder the selected lesson at the fast tape speed. Thus, where a particular lesson would take 30 minutes to playback from the master tape, the complete lesson is transferred to the student station from the master tape in only a few minutes, making the same and other lessons on the same tape available to another student after only a few minutes delay.

The recorder at each student station has a "playback" control for playing back the tape at the normal slow speed. Each such recorder further preferably has fast "rewind" and "wind" controls and a "stop" control. A "ready" indicator is most advantageously provided at each student station which indicator signals when the system is cleared to receive a new lesson at the student station. The indicator, in effect, indicates when the lesson selector controls at the student station can be effectively operated.

During a lesson transfer operation from the tape storage library to a student station, the student station recorder requesting the lesson is under full automatic control of the common tape transport and the various recorder and lesson selector controls at the student station requesting the information being transferred are disabled. Lesson numbers set up on the lesson selector control of other student stations during the transfer operation are memorized and become operative after completion of the transfer operation. After a transfer operation is completed, high speed automatic tape rewind operations take place at the storage library tape transport unit and the student station recorder involved so the tape at the tape storage library is in position for an immediate lesson transfer operation and control of the student station recorder is re-established.

The present invention has applicability on an individual school or city wide basis. For example, a tape storage master tape library with a tape transport unit as described can be set up at each school, or, more desirably from an economic viewpoint, at a common location which serves a number of or all of the schools in a particular area or city. In the latter case, the information will be communicated through telephone lines from the central library location to the individual schools involved.

The above and other advantages and features of the invention will become apparent upon making reference to the specification to follow, the claims and the drawings wherein:

Figure 2:
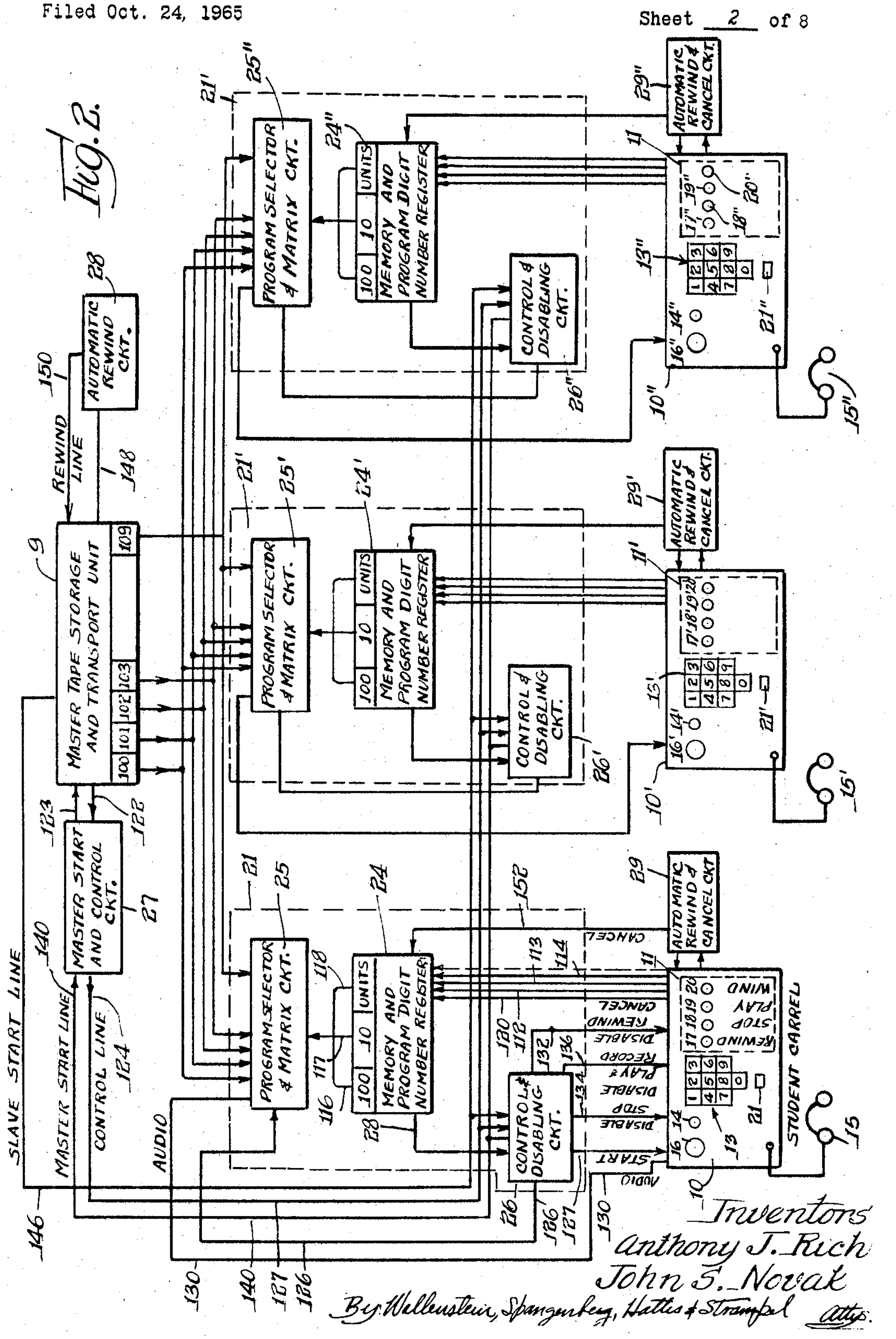
FIG. 2 is a detailed block diagram of the system as shown in FIG. 1.
Figure 3:
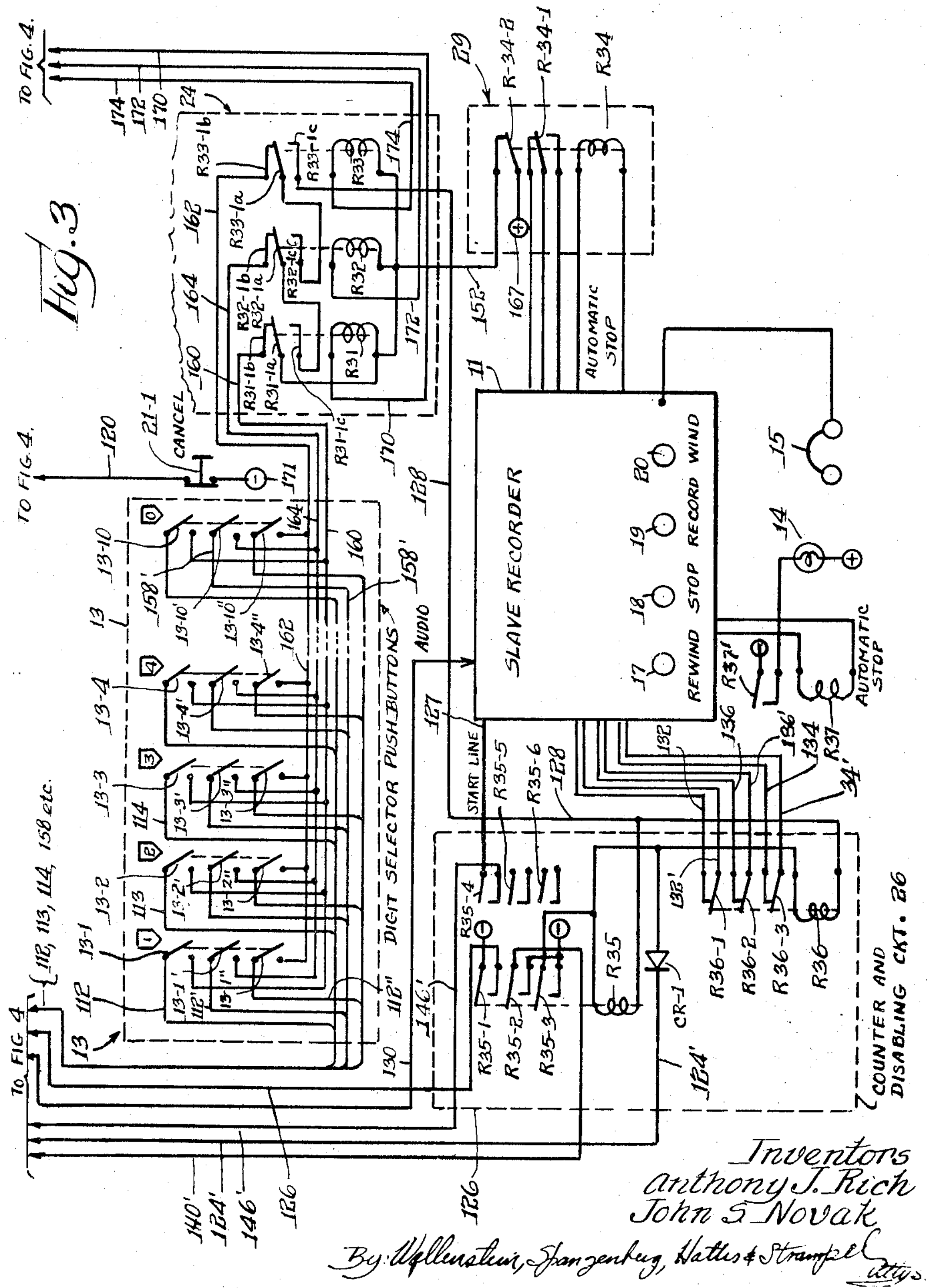
Figure 4:
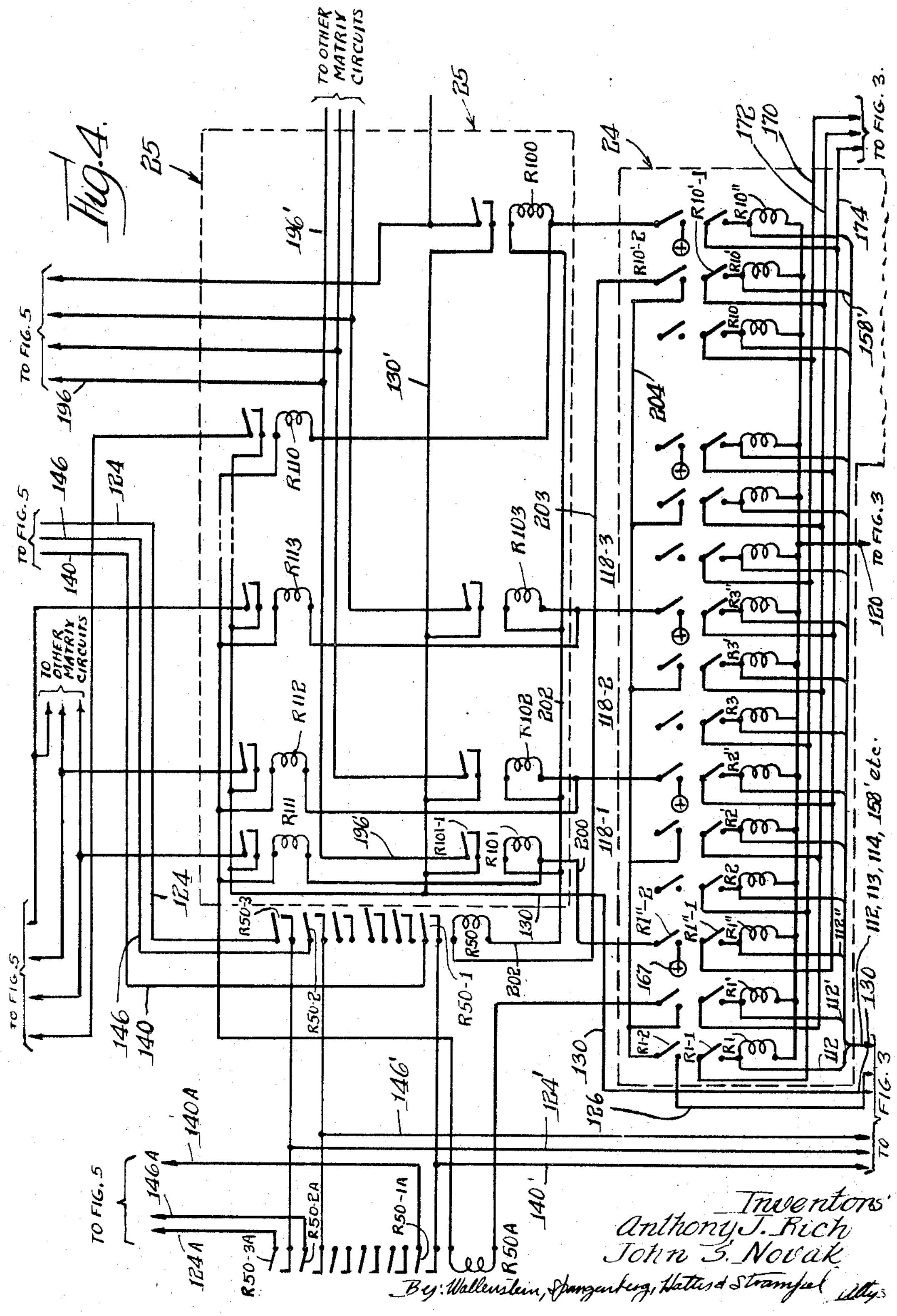
Figure 5:
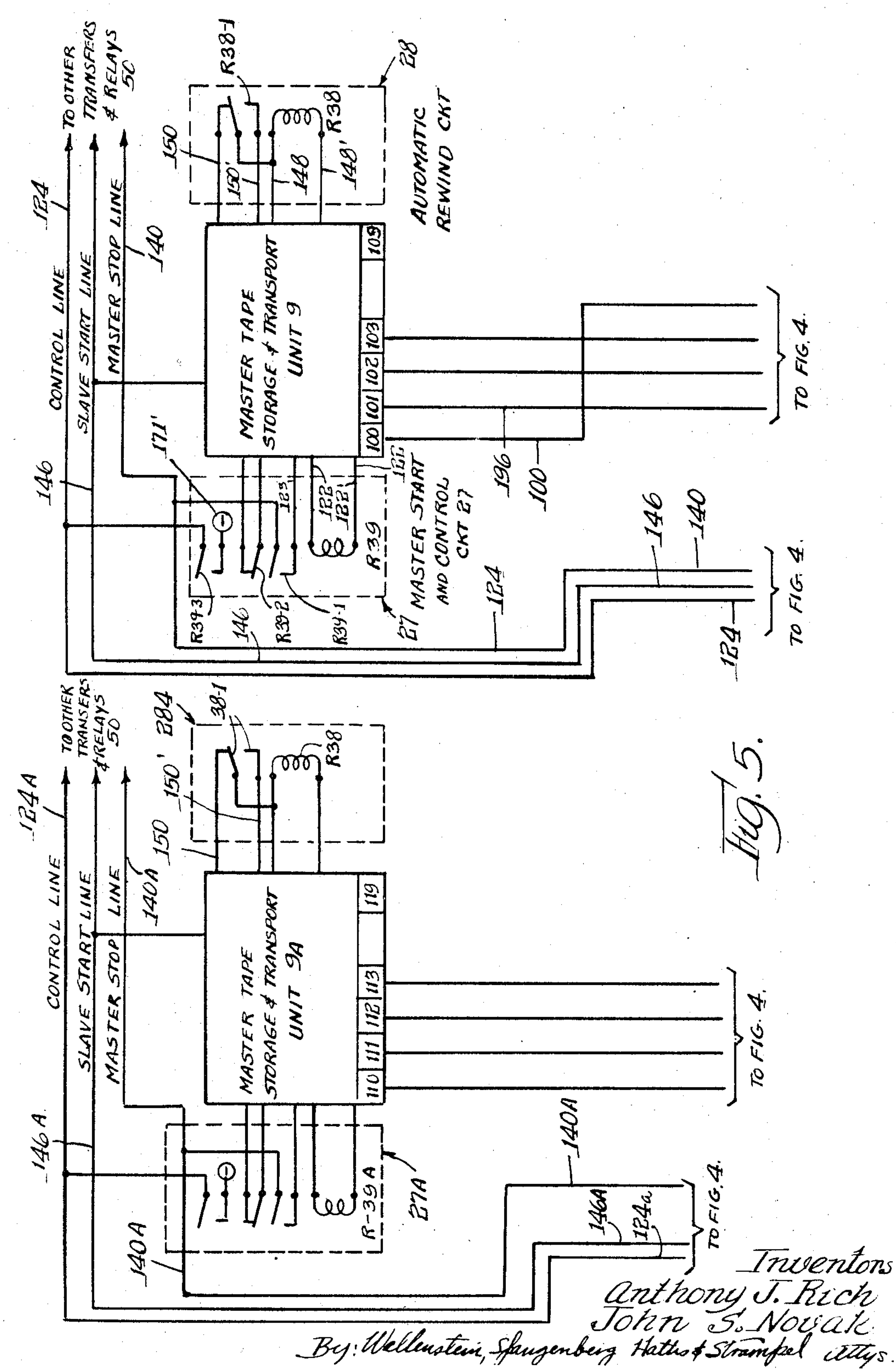
Figure 6:
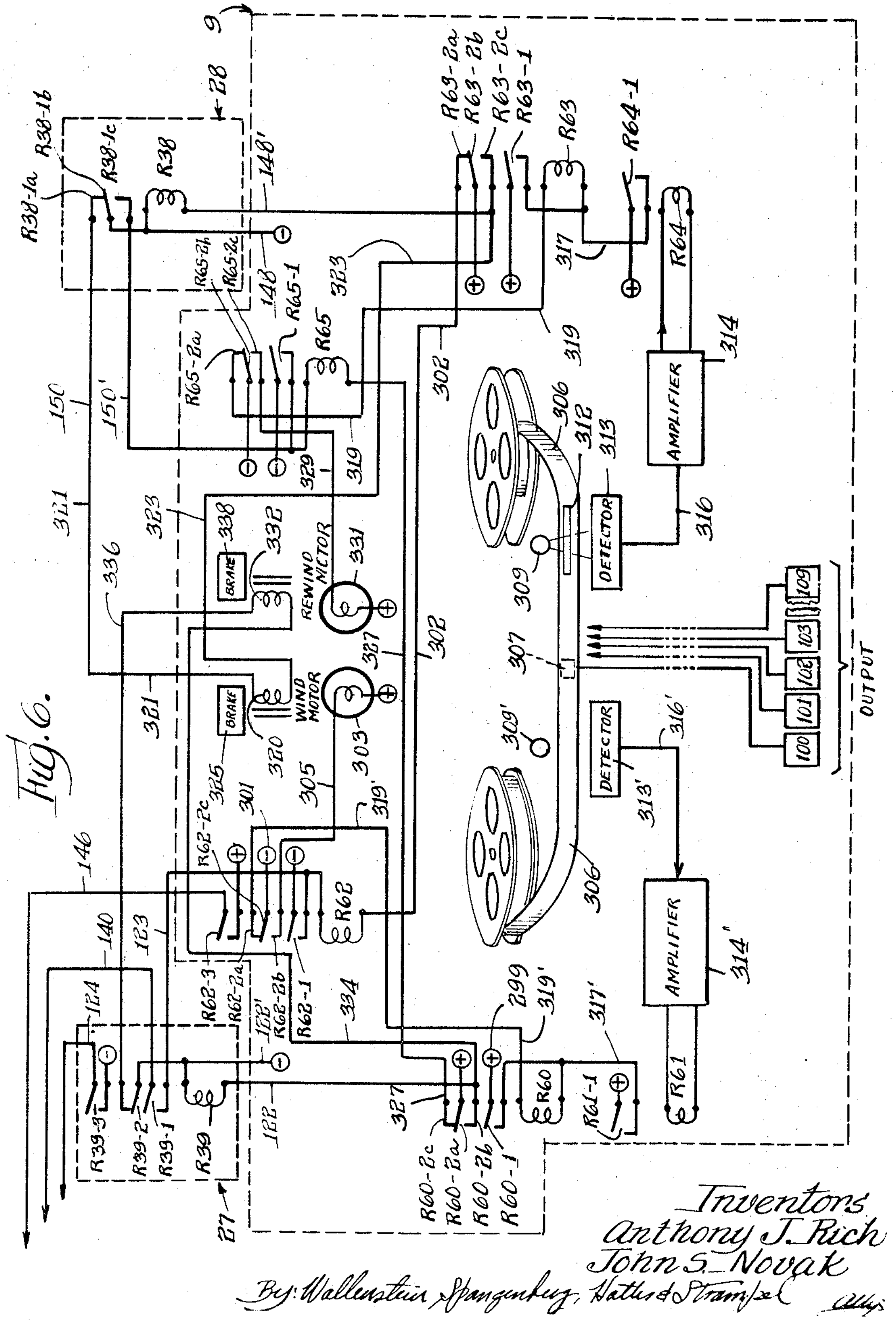
Figure 7:
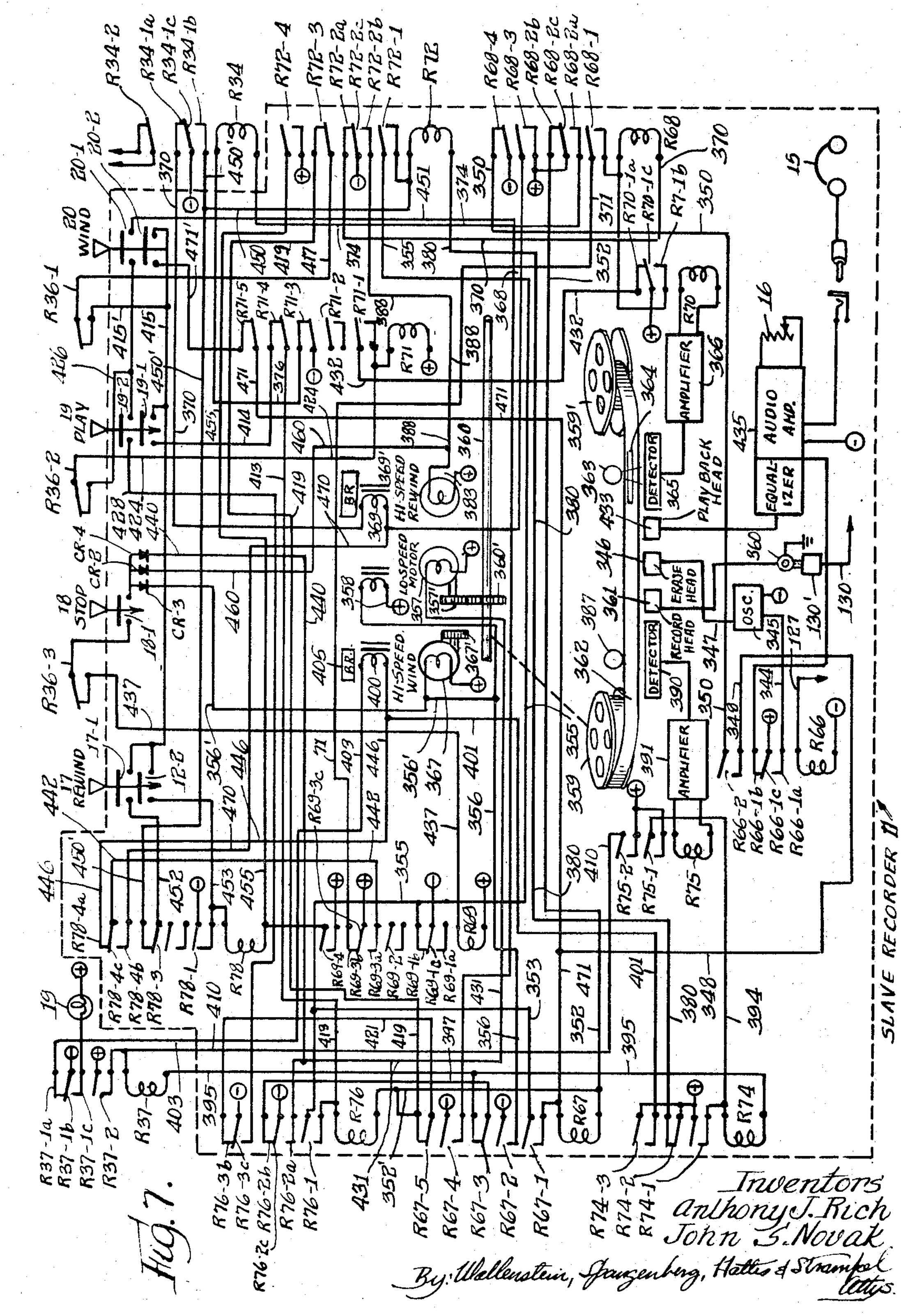
Figure 8:
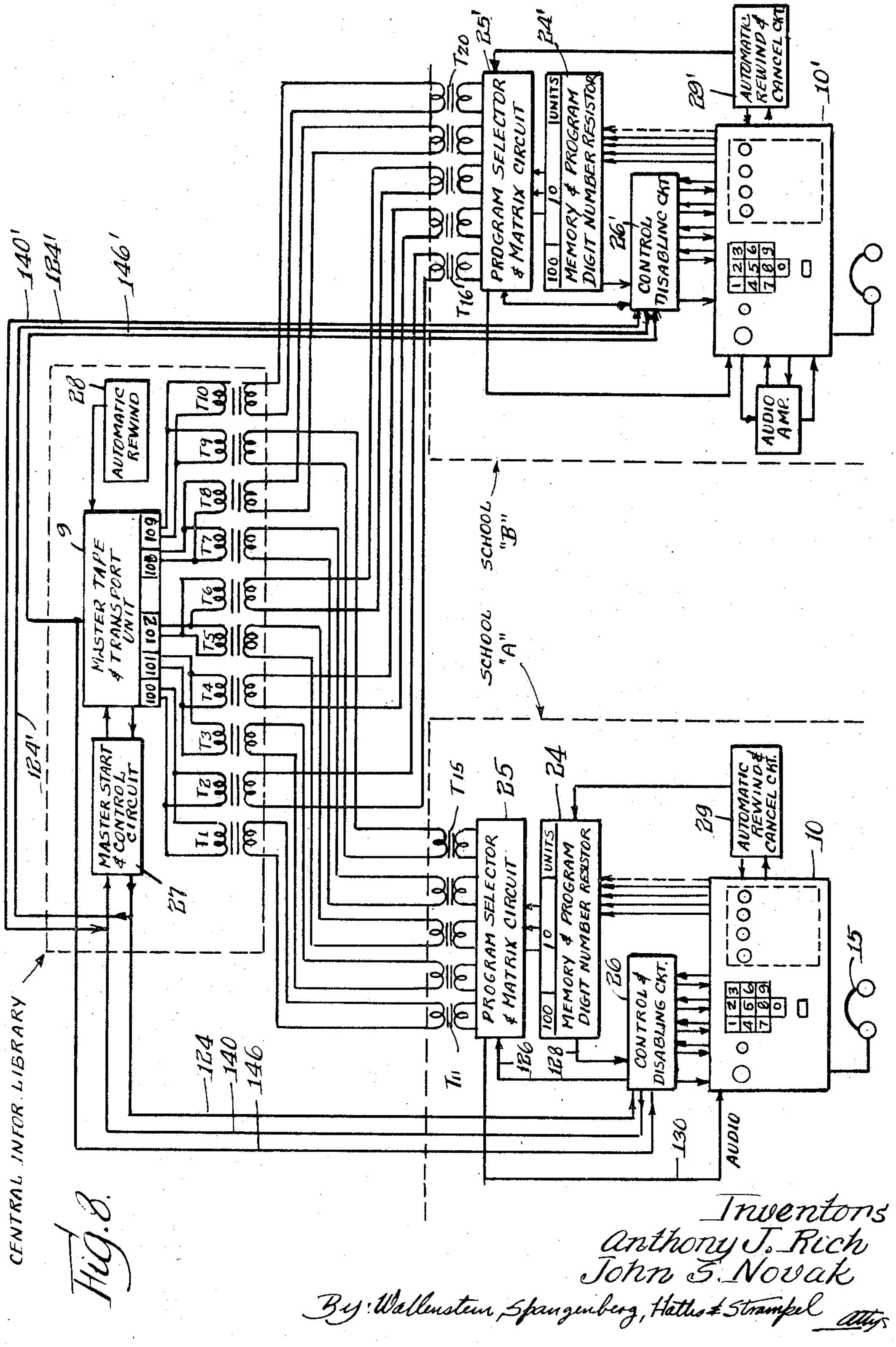

FIGS. 3–5 together form an overall partial circuit and block diagram of the system shown in FIG. 2;

FIG. 6 is an exemplary circuit diagram of a portion of the master tape storage and transport unit forming part of the system of FIGS. 1–5, showing the operation of the automatic stop and rewind portion thereof;

FIG. 7 is an exemplary circuit diagram of a portion of one of the slave recorders forming part of the system of FIGS. 1–5, showing the operation of the automatic stop and rewind portion thereof; and FIG. 8 is a simplified block diagram showing the application of the present invention to a school system where information is transmitted from a central information library through telephone lines to student stations at individual schools.

GENERAL DESCRIPTION

*(Basic block diagram of FIG. 1)*

Figure 1:
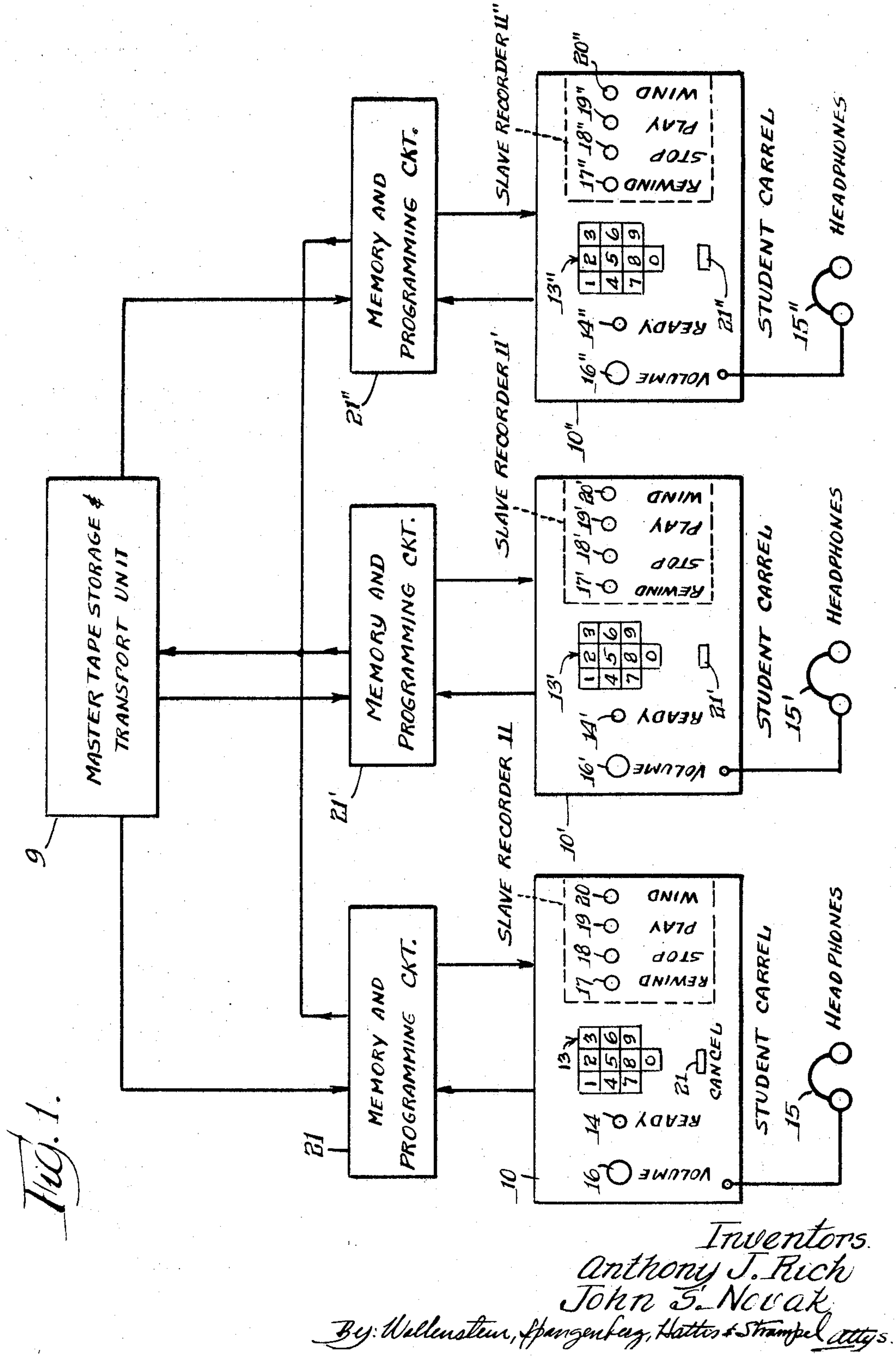
FIG. 1 is a simplified block diagram of an exemplary educational information transport and playback system of the present invention.

Referring now to FIG. 1 which illustrates a simplified block diagram of a preferred form of the invention, there is shown three single channel student carrels 10, 10′ and 10″ including student slave recorders 11, 11′ and 11″, a memory and programming unit 21, 21′ or 21″ for each carrel and a multi-channel master tape storage and transport unit 9, which contains a very large number of recorded lessons (one per channel) on a common magnetic tape which lessons can be transferred at a very high speed to a magnetic tape of the slave recorder of the one or more student carrels selecting the same.

All student carrels are identical and so the following description of student carrel 10 will suffice for the others whose parts are similarly numbered except for the addition of single or double primes distinguishing the different carrels. Student carrel 10 has lesson selector control push buttons 13 which may be a set of ten digit selector control push buttons used to select the digits 0–9, of a two or three digit number, a "Cancel" switch 21 to clear the system if an error is made in selecting the lesson number, a "Ready" indicator 14 which illuminates when the tape of the student carrel slave recorder 11 is stopped at the beginning of the tape thereof in what would be referred to as a ready position where it is ready to accept and record a signal from the master tape storage and transport unit 9. The student carrel also includes headphones 15 and a "Volume" control 16. The slave recorder is a two speed (like 30 inches per second high record speed and 1 inch per second low playback speed) single channel recorder with a "Rewind" control push button 17, a "Stop" control push button 18, a "Play" control push button 19 and a "Wind" control push button 20.

A memory and programming circuit 21 is associated with each student carrel which circuit has a number stored therein until cleared, selected by operation of the associated lesson selector push button 13. The memory and programming circuit selects a tape channel on the master tape storage and transport unit 9 corresponding to the lesson number the student has selected and it activates the master tape storage and transport unit when the master tape storage and transport unit tape is positioned to pick-up and transmit the information stored at the beginning of the tape involved, such position being referred to as the ready position thereof. The master tape storage and transport unit 9 is preferably a single speed multi-channel unit that is capable of operating and transferring the lessons on each channel thereof to a slave recorder at a high speed (e.g. the 30 inch per second speed of each slave recorder). When a lesson is initially selected by depressing the lessons selector control push buttons 13, the "Rewind" control push button 17, "Stop" control push button 18, "Play" control push button 19 and "Wind" control push button 20 are disabled and circuits associated with the master tape storage and transport unit automatically starts and runs the slave recorder involved at the high record speed. As a selected channel of the master tape storage and transport unit is completely transferred to the tape of the slave recorder involved, the slave recorder automatically stops the associated memory and programming circuit is cleared and the master tape storage and transport unit and slave recorder involved rewind their tapes to their ready positions at a high speed, such as the 30 inches per minute.

If, for example, the lesson numbers were selected at student carrels 10′ and 10″ while the master tape storage and transport unit 9 was transferring a 30 minute taped lesson to a slave recorder 11 in student carrel 10 (taking only one minute using the high speed transfer operation referred to), the student at carrels 10′ and 10″ at which the same or different lessons have been called for would have a maximum wait of about two minutes before the master tape storage and transport unit will transfer lessons to the slave recorders 11′ and 11″ at the student carrels 10′ and 10″.

Also, when the slave recorders 11, 11′ and 11″ have recorded a lesson and the tapes thereof have been rewound to their ready positions, the students have full control of the slave recorders with the "Rewind," "Stop," and "Wind" push buttons. Operation of the "Play" push button of a recorder will then operate the tape thereof at its normal slow playback speed (like 1 inch per second).

*Detailed, block diagram of FIG. 2*

Refer now to FIG. 2 which shows a more detailed block diagram of the information storage and playback system of FIG. 1. As before, only the student carrel 10 and associated circuits will be described since the other student carrels 10′ and 10″ and associated circuits are identical to the same. As previously indicated, the student will select a lesson number on the digit selector push buttons 13 of the student carrel 10, 10′ or 10″ only when the associated ready indicator 14 is illuminated. To illuminate the associated ready indicator 14, the tape of the slave recorder involved must be in its ready position, so the rewind control push buttons 17 may be depressed if the previous student depressed the "Stop" push button 18 and left the recorder in this condition.

When a lesson number is selected on digit selector control push buttons 13, a signal is sent through associated conductors 112, 113 and 114 to a memory and program digit number register 24 forming part of the associated memory and programming circuit and following which any further depression of the push buttons will not effect operation of the equivalent until a lesson transfer operation to the carrel involved is completed. The number set up on the push buttons 13 is stored in the register 24. At this time, "Cancel" switch 21 can be depressed to clear a memory and program digit number register 24 by opening a cancel line 120 if an error was made in selecting the program numbers.

The memory and program digit number register 24 prepares a relay in an associated program selector and matrix circuit 25 for energization through conductors 116, 117 and 118 and sends a signal to the associated control and disabling circuit 26 through a line 28. The signal on the line 28 prepares the control and disabling circuit 26 for operation by a signal fed thereto from a control line 124 which extends to the control and disabling circuit 26 from a master start and control circuit 27 which establishes a signal on the line 124 when the circuit 27 receives a signal on a line 122 extending from the master tape storage and transport unit 9. Such a signal appears on the line 122 when the tape of the master tape storage and transfer unit 9 is in its ready position.

When the control and disabling circuit 26 receives the aforementioned signals on the lines 128 and 124, a signal is applied to a line 126 extending from the control and disabling circuit 26 to the program selector and matrix circuit 25 which effects energization of the relay prepared for energization by the conductors 116, 117 and 118 of the memory and program digit number register 24.

Signals appearing on the lines 124 and 128 leading to the control and disabling circuit 26 also effects disabling of the "Rewind" push button 17, "Stop" push button 18, "Play" push button 19 and "Wind" push button 20 of the associated slave recorder, as by opening disabling rewind line 132, disabling stop line 134 and disabling play and record line 136 associated with the latter push buttons. The signals on the lines 126 and 128 also cause the disabling and control circuit 26 to send a signal on a master start line 140 to the master start and control circuit 27, which, in turn, feeds a signal on the line 123 extending to the master tape storage and transfer unit 9 which initiates the high speed movement of the tape of the unit 9 past the various pick-up heads coupled directly or through amplifiers to the signal output terminals 100, 101, etc. of the master tape storage and transfer unit 9. The signal appearing on the pick-up head of the selected channel determined by the energized relay in the active program selector and matrix circuit 25 is fed through a contact of the latter relay to an audio input line 130 extending to the recording head (not shown) of the associated slave recorder 11.

The presence of a signal on the line 123 extending to the master tape storage and transport unit 9 also causes a slave recorder start signal to appear on a line 146 extending from the master tape storage and transport unit 9 to the control and disabling circuit 26 which, in turn, causes a signal to appear on a start line 127 extending to the associated slave recorder to effect the high speed movement of the tape drive of the slave recorder.

When the master tape storage and transport unit 9 has transferred the selected lesson to a slave recorder, it automatically stops and sends a signal to an automatic rewind circuit 28 through a line 148. The automatic rewind circuit 28 activates the rewind circuit in the master tape storage and transport unit by sending a signal through a rewind line 150 which causes the tape of the master tape storage and transport unit to return to the ready position.

When the end portion of the tape of the slave recorder is moved past the recording head of the slave recorder, the tape stops, a signal is sent to an associated automatic rewind and cancel circuit 29 which in turn sends a signal to a rewind circuit in the slave recorder which rewinds the tape and opens the cancel line 152 to clear the memory and program digit number register 24. At this time the master tape storage and transport unit 9 loses control of the slave recorder involved and the student has control with the "Rewind" control push button 17, "Stop" control push button 181, "Play" control push button 19 and "Wind" control push button 19, when the ready light 14 illuminates. When the student depresses the "Play" control push button 19, it automatically operates the tape at the slow playback speed and the student then hears the recorded lesson in the associated headphone 15.

If students at carrels 10′–10″ select lesson numbers on the digit selector control push buttons 13′ and 13″ while the master tape storage and transport unit is in use, the memory relays in the memory and program digit number register 24′ and 24″ would retain the program numbers. When the master tape storage and transport unit rewinds the tape to the ready position, signals are sent from the master tape storage and transport unit on line 132 to master start and control circuit 27 and from the circuit 27 through the control line 124 to the control and disabling circuits 26′ and 26″ which disable the operation of the control push buttons 17–20 in the slave recorders 12′ and 12″ and initiate operation of the slave recorder 11′ and 11″ and the master tape storage and transport unit to record the program of the selected channel of the master tape storage and transport unit on the tapes of the recorders in the manner previously described.

*Exemplary circuitry of memory and program digit number register and digit selector push buttons*

It will be recalled that the ready indicator 14 must be illuminated before the student should depress the digit selector push buttons 13 to select a particular channel of the master tape storage and transport unit. When the tape of a slave recorder is stopped in its ready position, a voltage is sent to the coil of an automatic stop relay R37 (FIG. 3). The contacts R37–1 thereof close and the ready indicator 14 connected thereto is illuminated.

The memory and program digit number register 24 may consist of three banks of ten 4-pole relays R1 to R10, R1′ to R10′ and R″ to R10″ (FIG. 4) and three 1-pole, double throw relays R31, R32 and R33 (FIG. 3) for the hundreds, tens and digits of the program numbers. For purposes of illustration, it will be assumed that program number 101 is selected. (Obviously, any three digit number can be selected and the circuit will operate in a similar way with other corresponding relays associated with other numbers coming into operation.)

In the explanation to follow, the contacts of the relays are identified by using the basic reference character (such as R1) followed by a number and sometimes an alphabet character which identifies the particular set of contacts or contact of the relay involved. Also, the contacts of the relays are shown in their positions when the associated relay coils are de-energized. The following description applies equally to the corresponding circuits associated with student carrels 10″ and 10′.

When the digit 1 push button 13 in FIG. 3 is depressed, the coil of the digit register relay R1 in FIG. 4 is energized by completing the circuit through a conductor 112 push button contacts 13–1 in FIG. 3, conductor 160 and the contacts **R31–1*b* and R31–1*a*, cancel line 152 and the normally closed contacts R34–2 of a relay 34 to a positive voltage terminal 167. The negative connection to the coil of the digit register relay in R1 in FIG. 4 is supplied through a conductor 120 and the normally closed contacts of the cancel switch 21–1 to a negative voltage terminal 171**.

As the contacts R1–1 in FIG. 4 close, they switch the coils of the relays R1 and R31 (FIGS. 3–4) in series with the positive terminal 167 via a circuit including conductor 170, conductor 152 and normally closed contacts R34–2 of an automatic stop relay R34. The coil of relay R31 is energized and normally open contacts **R31–1*a* and R31–1*c* thereof are held closed. The closing of the contacts R31–1*a* and R31–1*c* prepares the second bank of ten digit register relays R1′ to R10′ for registering the second digit of the program number. As the digit 0 push button in FIG. 3 is depressed, the coil of the digit register relay R10′ in FIG. 4 is energized by completing the circuit through conductor 158′, push button contacts 13–10′, conductor 164, the contacts R32–1*b* and R32–1*a*, and contacts R31–1*c* and R31–1*a*, cancel line 152 and contacts R34–2 to positive voltage terminal 167. The negative voltage connection to the coil of the digit register relay R10′ in FIG. 4 is supplied through the conductor 120 and the normally closed contacts of the cancel switch 21–1 to a negative voltage terminal 171**.

As the contacts R10′–1 in FIG. 4 close, they switch the coils of the relay R10′ and R32 in FIGS. 3–4 in series with the positive voltage terminal 167 through a circuit including conductor 172 and conductor 152 and normally closed contacts R34–2. The coil of the relay R32 is thus energized and the contacts **R32–1*a* and R32–1*c* are held closed. The closing of the contacts R32–1*a* and R32–1*c* prepares the third bank of ten digit register relays R1″ to R10″** for registering the third digit of the program number.

As the third and final digit 1 push button in FIG. 3 is depressed, the coil of the digit register relay R1″ in FIG. 4 is energized by completing the circuit through conductor 112″, push button contacts 13–1″, conductor 162, contacts **R33–1*b* and R33–1*a*, R32–1*c* and R32–1*a*, R31–1*c* and R31–1*a*, cancel line 152 and contacts R34–2 to a positive voltage terminal 167. The negative voltage connection to the coil of the digit register relay R1″ is supplied in FIG. 4 through conductor 120 and the normally closed contacts of the cancel switch 21–1** to the negative voltage terminal.

As the contacts R1″–1 (FIG. 4) close, they switch the coils of relays R1″ and R33 in FIG. 3 in series with the positive voltage terminal 167 by a circuit including conductor 174, conductor 152 and normally closed contacts R34–2. The coil of the relay R33 is energized and the contacts R33–1a and R33–1c are held closed. The closing of the contacts R33–1a and R33–1c connects the coils of the control relays R35 and R36 to positive voltage terminal 167 through conductor 128, contacts R33–1c and R33–1a, R32–1c and R32–1a, R31–1c and R31–1a, cancel line 152 and the contacts R34–2. The opening of the contacts R33–1b and R33–1a removes the digit selector push buttons from the positive voltage terminal so any further depressing of the push buttons will not have any effect on the system.

If an error was made in selecting the program numbers, the cancel switch 21 could be depressed and the contacts 21–1 thereof in FIG. 3 would disconnect negative voltage from the cancel line 120 and clear the memory and program digit number register.

The program digit number register relays R1, R10′ and R1″ are energized and the system will hold the selected program numbers until the master tape storage and transport unit 9 has completed the tape to tape transfer, if it is in use.

*Exemplary circuitry of program selector and matrix circuit 25, control and disabling circuit 26, master start and control circuit 27 and automatic rewind circuits 28 and 29*

FIG. 2 illustrates only one master tape storage and transport unit 9 with ten channels on a single tape. FIG. 5 illustrates the use of two or more master tape storage and transfer units 9 and 9A so that more than ten information channels may be provided where the tape is only wide enough to accommodate ten tracks of information. The explanation to follow will deal, for the most part, with a description of the details of the circuits associated with the master tape storage and transfer unit 9 and slave recorder 11, it being understood that the corresponding circuits associated with the master tape storage and transport unit 9A and the other slave recorders are the same circuits and thus will not be described in detail.

Referring to FIG. 5, when the master tape storage and transport unit 9 completes a tape-to-tape transfer operation, the tape automatically stops and there is applied a voltage through conductor 148–148′ to the coil of a relay R38 of the automatic rewind circuit 28. The relay R38 is energized and its contacts operate to activate a rewind circuit to be described in the associated master tape and transport unit through line 150′.

When the tape drive of the master tape storage and transport unit 9 has returned the tape to its ready position, the tape automatically stops whereupon a voltage is fed to the coil of a relay R39 of the master start and control circuit 27 through conductors 122 and 122′ which energizes the relay to close contacts R39–1 and R39–3. If channel 101 has been selected by student carrel 10, relay R101 of the program selector and matrix circuit 25 is energized and the signal output of the master tape storage and transport unit is connected to the slave recorder 11 thereof through conductors 196 and 196′, contacts R101–1 (FIG. 4) and conductors 130′ and 130 to the input of the slave recorder. With the program digit number register relays R1, R10′ and R1″ representing number 101 energized, the coil of relay R101 is connected to a positive voltage terminal 167′ through R1″–2 and conductor 200. The connection of relay R101 to a negative voltage terminal is supplied through conductor 202, coil of a relay 50, conductor 203, contacts R10′–2, conductor 204, contacts R1–2, conductor 126 and contacts R35–1 of the control relay R35.

The relay R50 when energized closes its contacts R50–1, R50–2, R50–3 which respectively connect conductors 140, 146 and 124 leading from the master tape storage and transfer unit 9 and master start and control circuit 27 to the circuits associated with the slave recorder 11. A relay 50A is provided for slave recorder 11 to carry out a similar function to relay R50 with respect to lines 140A, 146A and 124A associated with master tape storage and transport unit 9A. The master tape storage and transport unit 9A has signal outputs supplying ten different lessons or programs. The relay R50 is energized in series with one of the digit relays R100, R101, R102, etc. associated with the correspondingly numbered outputs of the master tape storage and transport unit and relay 50A is energized in series with one of the relays R110, R111, R112, etc. associated with the correspondingly numbered outputs of the storage and transport unit 9A.

When the master tape storage and transport unit 9 or 9A is in the ready position, the control relays R35 and R36 are energized with a negative voltage connection thereto being supplied through diode CR1 and conductor 124′ in FIG. 3, contacts R50–3 in FIG. 4 and conductor 124 leading to contacts R39–3 of relay R39 in FIG. 5.

When the relays 101 and R50 in FIG. 4 are energized, the output of the selected channel of the master tape storage and transport unit 9 or 9A is connected to the input of the slave recorder 11 as previously described. The contacts R36–1, R36–2 and R36–3 of control relay R36 in FIG. 3 disable the wind push button 20, the play push button 19, the stop push button 18 and the rewind push button 17 by opening the conductors 132–132′, 134–134′ and 136–136′. When relays R35 and R50 become energized and contacts R35–4 and R50–2 (or R50–2A) close, they connect the slave start lines 146 (or 146A) and 146′ in series between the master tape storage and transport unit 9 (or 9A) to the slave recorder 11. The closure of contacts R35–2 of relay R35 and contacts R50–1 (or R50–1A) of relay R50 (or R50A) start the master tape storage and transport unit by connecting the master start line 140 to a negative voltage terminal, said conductor 140′ and contacts R35–2 (FIG. 3). The contacts R35–3 (FIG. 3) supply the negative voltage to the control relay coils R35 and R36 to hold the relays energized.

When the master tape storage and transport unit 9 or 9A completes a transfer operation, it automatically stops in a manner to be described later on in the specification. When the end of the tape of the slave recorder 11 reaches the pick-up head thereof, relay R34 (FIG. 3) becomes energized, and the tape automatically stops in a manner also to be explained. Contacts R34–2 then open the cancel relays R33, R32, R31 and relays R1, R10′, R1″, R101 and R50. The control relays R35 and R36 are then de-energized and the rewind push button 17, stop push button 18, play push button 19, and the wind push button 20 then control the slave recorder 11.

When the beginning of the tape of the slave recorder 11 reaches the pick-up head of the slave recorder R37 (FIG. 3) energizes to stop the tape through contacts (not shown in FIG. 3) and the contacts R37–1 thereof close to illuminate the ready indicator 14. At this time, the student would depress the "Play" push button 19 and have full control of the slave recorder as he listens to the lesson or program through the headphones 15 and effects fast rewind or (forward) wind operations in a conventional way with the push buttons 17, 19 and 20.

*Exemplary circuitry for part of master tape storage and transport unit effecting automatic stop and rewind operations (FIG. 6)*

As previously indicated, each master tape storage and transport unit 9 (or 9A) includes a high speed (such as 30 inches per second) drive with automatic stop and rewind features. It also preferably features separate equalizer and line amplifiers well known in the art for each channel so all outputs are independent and can be used simultaneously.

When the tape of a master tape storage and transport unit is in its ready position, a stop relay R60 is energized and is held energized by its closed contacts R60–1 connected to a positive voltage terminal 299 of a voltage source and a conductor 319′ connected through contacts R62–2*a* and R62–2*c* of a relay R62 to a negative voltage terminal 301 of the voltage source. At this time the relay R39, which operates with a small delay when energized, is energized through conductor 122′ extending to a negative voltage terminal and conductor 122 through contacts R60–2*b* and R60–2*a* connected to a positive voltage terminal. Contacts R39–1 of relay R39 close to permit the master tape storage and transport unit to receive a signal from a student carrel to start a tape-to-tape transfer operation by placing a negative voltage originating in the control and disabling circuit 26 on input line 123 which energizes a relay R62. Positive voltage is connected to the relay R62 through a conductor 302 and contacts R63–2*a* and R63–2*b* of a relay R63. At this time, contacts R62–1, contacts R62–2*c* and R62–2*b* and contacts R62–3 of relay R62 will close. The closing of contacts R62–1 holds relays R62 energized by switching one coil lead to a negative voltage terminal, the positive voltage is supplied as previously explained. The closing of contacts R62–2*c* and R62–2*b* starts wind motor 303 by connecting a conductor 305 to a negative voltage terminal. At this time, contacts R62–2*a* and R62–2*c* separate to disconnect the negative voltage on conductor 319′ to a relay R60, which de-energizes. This in turn de-energizes relay R39 by disconnecting positive voltage to the coil thereof previously coupled thereto by conductor 122. The closing of contacts R62–3 starts the slave recorders in the student carrel positions that have selected a taped program on the illustrated master tape storage and transport unit by switching the slave start line 146 to a positive voltage terminal. At this time, the selected output or outputs are transferring the taped programs to the proper slave recorders and any further selecting of programs on the master tape storage and transport unit will be held in memory until the master tape storage and transport unit has completed the transfer operation and rewound its tape 306 in FIG. 6.

When the end portion of the tape 306 in FIG. 6 of the tape storage and transport unit passes by a pick-up head 307 thereof, a light 309 shines a beam of light through a transparent opening 312 in the tape and into a light detector 313. A signal is sent from the detector 313 to an amplifier 314 through a conductor 316 and the signal is amplified and a relay R64 in the output of the amplifier energizes.

As the relay energizes, the contacts R64–1 close and the relay coil of a relay R63 is energized through a conductor 317 and closed contacts R64–1 of relay R64 connected to a positive voltage terminal of a voltage source and through a conductor 319 and normally closed contacts R65–2*a* and R65–2*b* of a relay R65 connected to the negative terminal of the voltage source. At this time, with relay R63 energized, contacts R63–1, R63–2*b* and R63–2*c* thereof close while contacts R63–2*a* and R63–2*b* separate. The closing of contacts R63–1 holds the relay coil R63 in an energized state by switching the coil lead to a positive voltage terminal.

The closing of contacts R63–2*b* and R63–2*c* connects a positive voltage terminal to the delay relay R38 through the conductor 148′. At this time, contacts R63–2*a* and R63–2*b* disconnect the positive voltage terminal from the conductor 302 which connects to the coil of relay R62 and causes relay R62 to de-energize. As contact R62–2*c* separates from contact R62–2*b*, the negative voltage terminal is removed from the wind motor 303. A brake solenoid 320 is energized through a conductor 321, normally closed contacts R38–1*a* and R38–1*b* and conductor 148 leading to a negative voltage terminal. Althrough the delay relay R38 has voltage on its coil terminals at the instant now being examined due to the delay action thereof, its normally closed contacts R38–1*a* and R38–1*b* have not yet separated. Positive voltage is supplied to brake solenoid 320 through contacts R63–2*b* and R63–2*c* and a conductor 323. A brake 325 operated by the solenoid then stops the tape reels. The delay relay R38 then energizes and its contacts R38–1*a* and R38–1*b* separate to release the brake 325 by de-energizing the brake solenoid 320 by disconnecting the conductor 321 from the negative voltage terminal. The contacts R38–1*b* and R38–1*c* close and energize relay R65 by connecting the negative voltage terminal through conductor 150′ to the coil of relay R65. The positive voltage is supplied to the relay R65 through a conductor 327 and contacts R60–2*a* and R60–2*c*.

At this time contacts R65–1 close to hold relay coil R65 energized by connecting the coil terminal to a negative voltage terminal. As normally closed contacts R65–2*a* and R65–2*b* separate, the negative voltage terminal is decoupled from conductor 319, and the relay R63 connected to conductor 319 is de-energized. The closing of the contacts R65–2*b* and R65–2*c* connects a negative voltage terminal to conductor 329 which starts a rewind motor 331. Then, the tape 306 rewinds to its start or ready position where a light 309′ will shine a beam of light through a transparent opening (not shown) into a detector 313′. A signal is then sent to an amplifier 314′ through a conductor 316′, and the signal is amplified and relay R61 in the output of the amplifier energizes. The contacts R61–1 of relay R61 close and a positive voltage terminal is connected through a conductor 317′ to the coil of relay R60 which energizes the relay. A negative voltage is supplied through a conductor 319′ and normally closed contacts R62–2*a* and R62–2*c*. Contacts R60–2*a* and R60–2*c* open and positive voltage terminal is disconnected from conductor 327 and relay R65 is de-energized. The de-energizing of relay R65 causes contacts R65–2*b* and R65–2*c* to separate to disconnect the negative voltage terminal from conductor 329, disconnecting power from the rewind motor 331. At the same time, contacts R60–2*a* and R60–2*b* close to energize a brake solenoid 332 by connecting a positive voltage terminal to the solenoid through a conductor 334. The negative voltage supply is connected through a conductor 336, normally closed contacts R39–2 and conductor 122′ extending to a negative voltage terminal.

The relay R39, which is a delay relay like relay R38, is also activated with the closing of contacts R60–2*b* and R60–2*a* which connects conductor 122 to a positive voltage terminal, while the negative voltage is supplied through the conductor 122′. The delay relay R39 actuates its contacts after brake solenoid 332 has operated its brake 338 and the master tape storage and transport unit reels have stopped. At this time, the delay relay R39 energizes and the contacts R39–2 thereof open to de-energize the brake solenoid by disconnecting the negative voltage terminal connected to conductor 122′ from conductor 336 which connects to the brake solenoid 338. When the contacts R39–1 close, the master start line 140 is connected to conductor 123, wherein the master tape storage and transport unit is ready to supply another tape-to-tape transfer operation when called for.

*Exemplary circuitry for part of slave recorder effecting automatic stop, wind and rewind operations (FIG. 7)*

The slave tape drive of each slave recorder is a two speed (e.g. 30 inches and one inch per second) single channel unit with provision for automatic stop and rewind. The high speed is used for tape rewind and for the tape-to-tape transfer operation from the master tape storage and transport unit to the slave recorder and the low speed is used for playback. After a tape-to-tape transfer operation is completed, the student has full control with the "Rewind" push button 17, "Stop" push button 18, "Play" push button 19 and "Wind" push button 20.

When the slave recorder receives a signal on the start line 127 from the contact and disabling circuit 26, a relay R66 is energized and contacts R66–1*a* and R66–1*c* and contacts R66–2 thereof close. As contacts R66–1*a* and R66–1*c* close, a positive voltage terminal is connected to a conductor 344 which energizes an erase oscillator 345 which has its output connected to an erase head 346 through a conductor 347. The erase head 346 will remove the previously taped program while the selected program is being taped. At this time, contacts R66–2 of relay R66 close and a relay R67 is energized through a circuit leading to a negative voltage including conductor 348, contacts R66–2, conductor 350, and the normally closed contacts R68–4 of a relay R68 connected to a negative voltage terminal. Positive voltage is coupled to the relay R67 through conductor 352 and normally closed contacts R68–2*b* and R68–2*c* connected to a positive voltage terminal.

The relay R67 is held energized by closed holding contacts R67–1 and a conductor 353, conductor 355, and the normally closed contacts R69–1*b* and R69–1*c* connected to a negative voltage terminal. The closed contacts R67–2 connect a negative voltage terminal to a conductor 356 and in so doing energizes a gear controlling solenoid 358 to which the conductor extends. The gear solenoid may control the position of a shaft 360 drivingly connected to the carriage of the take-up reel 359 for the tape 362. The shaft carries a coupling gear 360′ which normally engages a drive gear 357′ of a low speed playback motor 357. When the solenoid 358 is energized, the shaft 360 is moved to bring the coupling gear 360′ into engagement with the drive gear 367′ of a high speed motor 367. The high speed motor 367 of the exemplary circuit is coupled across the solenoid 358 so that the two are energized together.

Now the high speed tape-to-tape transfer operation of the program begins, and the signal appearing on audio input line 130 connected by a plug connection 130′ to an input jack 360 is coupled to the record head 361 of the slave recorder to record on the tape 362. When the tape-to-tape transfer operation has been completed, a light 363 shines a beam of light through a transparent opening 364 into a detector 365. A signal is then sent to an amplifier 366, the signal is amplified and a relay R70 in the output of the amplifier energizes to close contacts R70–1*b* and R70–1*c*.

When the contacts R70–1*b* and R70–1*c* close, relay R68 is energized by the connection of a positive voltage terminal thereto through contacts R70–1*b* and R70–1*c*. A negative voltage is supplied to the relay R68 through a conductor 370 and normally closed contacts R72–2*a* and R72–2*c*. Relay R68 is held energized as holding contacts R68–1 close to connect a positive voltage terminal through normally closed contacts R69–3*b* and R69–3*c* of a relay R69 and a conductor 371 leading to the contacts R68–1. Contacts R68–2*b* and R68–2*c* open to remove a positive voltage terminal from conductor 352 which de-energizes relay R67 which opens its contacts R67–2, which, in turn, removes the negative voltage terminal from conductor 356 which de-energizes the gear solenoid 358 to stop the high speed drive of the take-up reel 359. At the same time, contacts R68–3 close to connect a positive voltage terminal to a conductor 368 extending to a brake solenoid 369 which, when energized, moves a brake 369′ against the carriages of heels 359 and 359′. Negative voltage is supplied to the solenoid 369 through a conductor 370 and normally closed contacts R34–1*a* and R34–1*c* of relay R34 (which has a delayed action when energized) to a negative voltage terminal. The tape drive shaft 360 stops and the delay relay R34 becomes energized by the closing of contacts R68–2*a* and R68–2*c* which connects a conductor 374 extending to the relay R34 to a positive voltage terminal. Negative voltage is supplied to relay R34 through a conductor 376 and normally closed contacts R71–3 to a negative voltage terminal.

Energization of relay R34 closes contacts R34–1*b* and R34–1*c* which connects a negative voltage terminal to a conductor 450 extending to a relay R72 to energize the same. Positive voltage is connected to relay R72 by a conductor 380 and normally closed contacts R74–2 of a relay R74 to a positive voltage terminal. At this time, contacts R34–1*a* and R34–1*c* separate to de-energize the brake solenoid 369 by disconnecting conductor 370 from the negative voltage terminal. The relay R72 is held energized by holding contacts R72–1 which connect a conductor 355 to a negative voltage terminal through contacts R69–1*b* and R69–1*c*.

A rewind motor 383 is provided which starts as contacts R72–2*b* and R72–2*c* close to connect a negative voltage terminal to conductor 388. The rewind motor is coupled to a carriage (not shown) which carries supply reel 359′. Normally closed contacts R72–2*a* and R72–2*c* separate upon energization of relay R72 to de-energize relay R68 as negative voltage is disconnected from the conductor 370.

When the slave recorder fully rewinds the tape 362, a light 387 shines a beam of light through a transparent opening of the tape (not shown) into a detector 390. Then a signal is sent to an amplifier 391. The signal is amplified and a relay R75 in the output of the amplifier 391 is energized. The contacts R75–1 of relay R75 then close to connect a positive voltage to a conductor 394 and relay R74 which energizes. Negative voltage supply to relay R74 is supplied through a conductor 395, normally closed contacts R67–3, conductor 397 and normally closed contacts R76–2*b* and R76–2*c*.

With the energizing of relay R74, normally open contacts R74–1 thereof close to hold the relay energized by connecting the coil thereof to a positive voltage terminal. As normally closed contacts R74–2 thereof open, positive voltage is disconnected from conductor 380 to de-energize relay R72. This, in turn, stops the rewind motor 383 by opening contact R72–2*b* and R72–2*c* and disconnecting conductor 388 from the negative voltage terminal.

As the contacts R74–3 close on the energization of relay R74, positive voltage is connected to a brake solenoid 400 through a conductor 401. Negative voltage is connected to the brake solenoid 400 through a conductor 403 and normally closed contacts R37–1*b* and R37–1*a* of a relay R37 to a negative voltage terminal. At this time, the brake solenoid 400 operates a brake 405 to stop the rotation of the supply reel carriage.

The energizing of relay R75 closes contacts R75–2 which connects positive voltage to a conductor 410 to activate the relay R37 which has a delayed action when energized. Thus, after the tape supply reel stops on rewind, delay relay R37 becomes energized. Contacts R37–1*b* and R37–1*a* of relay R37 then separate to de-energize brake solenoid 400 by removing negative voltage from conductor 403 which connects with the brake solenoid 400. Contacts R37–2 of relay R37 close upon energization of relay R37 to hold the relay energized by the connection of the coil thereof to positive voltage. At this time the ready indicator lamp 14 is illuminated by closure of contacts R37–1*b* and R37–1*c* which connects the lamp to a negative voltage terminal.

During the tape-to-tape transfer the "Rewind" push button 17, "Stop" push button 18, "Play" push button 19 and "Wind" push button 20 are disabled by the open contacts R36–1, R36–2 and R36–3 of relay R36 (FIG. 3). When the tape-to-tape transfer has been completed, the latter contacts are closed and relay R66 is de-energized and the audio input line 130 is disconnected from the master tape storage and transport unit and the student has full control of the slave recorder with the "Rewind" push button 17, "Stop" push button 18, "Play" push button 19 and "Wind" push button 20.

When the "Play" push button 19 is depressed, the relay R76 is energized by the connection of relay R76 to a negative voltage terminal through a conductor 413, normally closed contacts R71–4 of a relay R71, a conductor 414, "Play" push button contacts 19–1, conductor 415 normally losed contacts R36–1, conductor 417, normally closed contacts R72–3, conductor 419, normally closed contacts R67–5, conductor 421, and normally closed contacts R76–3*b* and R76–3*c*. Positive voltage is supplied to relay R76 through conductors 352′ and 352, normally closed contacts R68–2*b* and R68–2*c*. At this time, relay R71 is energized by connection of a negative voltage to the relay through conductor 424, normally closed contact R36–2, conductor 426 and the "Play" push button switch contacts 19–2, conductor 428 and closed contacts R76–3*a* and R76–3*c*. The relay R71 is held energized as contacts R71–1 thereof close to connect the relay through conductor 432 and normally closed contacts R70–1*a* and R70–1*c* to a positive voltage terminal.

When the relay R76 energizes with depression of the "Play" push button 19, contacts R76–2*a* and R76–2*c* close to connect a negative voltage terminal to conductor 431 to start the low speed playback motor 357. At this time the student can hear the taped program on the headset 15 and can control the volume with the "Volume" control 16 as the signal is picked up by the playback head 433 and fed through the equalizer and audio amplifier 435.

To stop the tape drive during playback, the student depresses the "Stop" push button 18 whereupon relay R69 is energized by the connection thereto of a negative voltage terminal through conductor 437, closed contacts R36–3, "Stop" push button switch contacts 18–1, diode CR4, conductor 440 and 431 and contacts R76–2*a* and R76–2*c*. Then, normally closed contacts R69–1*b* and R69–1*c* separate to disconnect a negative voltage terminal from conductor 355 and relay R76 de-energizes. Contacts R76–2*a* and R76–2*c* separate to disconnect negative voltage terminal from the conductor 431 to de-energize the low speed playback motor 357. At this time, contacts R69–3*b* and R69–3*a* close, connecting conductor 442 and conductor 446 through contacts R78–4*a* and R78–4*c* to a positive voltage terminal, which activates brake solenoid 400 and stops the tape reels. Then a delayed release of relay R69 opens contacts R69–3*a* and R69–3*c* to de-energize the brake solenoid 400.

If the "Rewind" push button 17 is depressed relay R72 would be energized by the connection of the relay R72 to a negative terminal through conductors 450 and 450′, normally closed contacts R78–3, conductor 452, rewind push button contacts 17–1, conductor 415, normally closed contacts R36–1, conductor 417, normally closed contacts R72–3, conductor 419, normally closed contacts R67–5, conductor 421 and normally closed contacts R76–3*b* and R76–3*c*. Positive voltage is supplied to relay R72 through conductor 380 and normally closed contacts R74–2. As contacts R72–1 close, relay R72 is held energized by its connection to a negative voltage terminal through conductor 355 and normally closed contacts R69–1*b* and R69–1*c*. Contacts R72–2*b* and R72–2*c* close to connect a negative voltage terminal to rewind motor 383 through conductor 388. At this time, relay R78 is also energized by connection of a negative voltage terminal thereto through conductor 453 and rewind push button contacts 17–2. Positive voltage is connected to relay R78 through conductor 455 and contacts R72–4. The relay R78 is held energized by closure of holding contacts R78–1 which connects the relay to a negative voltage terminal and the tape is rewound to its ready position.

To stop a rewind operation, the "Stop" push button 18 is depressed to energize relay R69 through a circuit including conductor 437, normally closed contacts R36–3, push button contacts 18–1, diode CR2, conductors 460 and 388 and closed contacts R72–2*b* and R72–2*c*. Contacts R69–1*b* and R69–1*c* separate to disconnect the negative voltage from conductor 355 leading to relay R72 through holding contacts R72–1 which relay then becomes de-energized. Closed contacts R69–4 then provide positive voltage to hold relay R78 energized instead of contacts R72–4 of de-energized relay R72. As contacts R72–2*b* and R72–2*c* separate, negative voltage is disconnected from conductor 388 leading to rewind motor 383 so the rewind motor stops. As normally open contacts R69–3*a* and R69–3*c* close, positive voltage is connected to brake solenoid 369 to energize the same through conductor 442, contacts R78–4*b* and R78–4*c* and conductor 470 wherein brake 369′ stops the tape rewind drive. Relay R69 with a delay on release de-energizes upon release of the push button 18.

To start a wind operation, push button 20 is depressed to energize relay R67 through conductor 471, contacts R71–5, conductor 471′, contacts 20–2, conductor 415′, contacts R36–1, conductor 417, normally closed contacts R72–3, conductor 419, normally closed contacts R67–5, conductor 421 and normally closed contacts R67–3*b* and R67–3*c* to a negative voltage terminal. Positive voltage is connected to relay R67 through conductor 352 and normally closed contacts R68–2*b* and R68–2*c* to a positive voltage terminal. As contacts R67–2 close, negative voltage is connected to the motor 367 through conductor 356.

To stop the high speed wind, the "Stop" push button 18 would be depressed and relay R69 would energize. At this time, the relay R67 would de-energize as the normally closed contacts R69–1*b* and R69–1*c* separate to disconnect the negative voltage terminal from conductor 355 extending to relay R67 through conductor 353 and holding contacts R67–1. Negative voltage to the high speed wind motor 367 is removed as the contacts R67–2 open to remove negative voltage from the conductors 356 and 356′. As the contacts R69–3*a* and R69–3*c* close, the brake solenoid 400 is energized. The positive voltage source to the solenoid 400, is through the conductor 446, normally closed contacts R78–4*c*, conductor 442 and the just closed contacts R69–3*a* and R69–3*c*. Negative voltage is fed to solenoid 400 through the conductor 403 and normally closed contacts R37–2*a* and R37–2*b*. At this time, the brake would stop the carriages of reels 359 and 359′ and relay R69 would become de-energized upon release of the "Stop" push button 18. The relay R69 is a delay relay on release to ensure the closure of normally open contacts R69–3*a* and R69–3*c* for a sufficient period to enable the brake 400 to operate. The brake solenoid becomes de-energized as the contacts R69–3*a* and R69–3*c* open to release the brake mechanism.

*Remote information library for school system (FIG. 8)*

The present invention has a great value in an overall school system where a central library of taped information can service an entire school system where the information is transferred over telephone lines to each school. This would eliminate the need for a complete tape library at each school and lessons could be up-dated immediately.

Classrooms using this system could be supervised by student teachers, yet students could receive the finest possible education from tapes cut by the most learned instructors.

Refer now to FIG. 8. The basic system would remain the same as previously explained except leased lines would be used between the master tape transport and the student carrels at School "A," "B," etc. The only other change is the addition of transformers T1 through T10 at the master tape storage and transport unit and transformer T11 through T15 located in School "A," T16 through T20 located in School "B" etc. are needed for input and output impedance matching of the connection of the recorders and the master tape storage and transport unit to the leased lines.

It should be understood that numerous modifications may be made in the preferred form of the invention shown in the drawings without deviating from the broader aspects of the invention.

We claim:

1. An information storage and playback system comprising: individual information receiving stations at which prerecorded information representing individual audible lessons or programs are to be audibly presented, each of the information receiving stations including lesson or program identifying means operable by the user to identify any one of a number of lessons or programs to be fed to the station, a common information storage station from which the information receiving stations are to receive the lessons or programs, said common information storage station having storage means for storing simultaneously said lessons or programs and high speed information transmitting means, and first control means responsive to the lesson or program identifying means operated at an information receiving station for identifying a particular lesson or program for automatically operating the high speed transmitting means to transfer the selected lesson or program from the storage means thereat to such receiving station at an abnormally high speed and continuously until the selected lesson or program is transmitted without interruption, and each of the information receiving stations having associated therewith information recording means for receiving and recording the information continuously transmitted thereto at said abnormally high speed and playback means controlled by the person at the information receiving station involved for audibly playing back the recorded information at a normal relatively slow speed.

2. The information storage and playback system of claim 1 wherein there is provided memory means for memorizing the lesson or program identified by the operation of the lesson or program identifying means at any information receiving station, said first control means being normally responsive to the lesson or program information in the memory means by transferring the lesson or program to the recording means of the information receiving station involved, and means for preventing the transfer of a selected lesson or program to an information receiving station when the lesson or program identifying means thereof is operated during a lesson or program transfer operation to another information receiving station until the transfer of the latter lesson or program is completed.

3. The information storage and playback system of claim 1 wherein said recording means of each information receiving station is automatically controlled by said first control means.

4. The information storage and playback system of claim 1 wherein there is provided memory means for memorizing the lesson or program identified by the operation of the lesson or program identifying means at any information receiving station, said first control means being normally responsive to the lesson or program information in the memory means by transferring the lesson or program to the recording means of the information receiving station involved, means following completion of the transfer of a lesson or program to an information receiving station for automatically clearing said memory means thereof, and means for preventing the transfer of a selected lesson or program to an information receiving station when the lesson or program identifying means thereof is operated during a lesson or program transfer operation to another information receiving station until the transfer of the latter lesson or program is completed.

5. The information storage and playback system of claim 4 wherein there is provided at each information receiving station manually operable control means selectively operable by the user for operating the playback means to play back at said normal relatively slow speed all or any selected portion of the lesson or program stored on the recording means thereat, and there is provided inhibiting means for rendering the operation of said manually operable control means at an information receiving station ineffective until its associated memory means is cleared.

6. The information storage and playback system of claim 1 wherein there is provided at each information receiving station manually operable control means selectively operable by the user for operating the playback means to play back at said normal relatively slow speed all or any selected portion of the lesson or program stored on the recording means thereat.

7. The information storage and playback system of claim 6 wherein said recording means of said information receiving stations include magnetic storage tracks provided with information pick-up and recording head means, one of the last two mentioned means being movable with respect to the other at said high speed, the movable one of said means of each information receiving station being movable also at said relatively slow speed during a playback operation, said manually operable control means at each information receiving station controlling the movement of the movable one of said two mentioned means, and there is provided inhibiting means for rendering operation of said manually operable control means at each information receiving station ineffective during the transfer of a lesson or program to the recording means thereof.

8. The information storage and playback system of claim 6 wherein there is provided inhibiting means for rendering the operation of said manually operable control means at an information receiving station ineffective during the transfer of a program or lesson from the storage means of the common information storage station to the recording means of the information receiving station involved.

9. The information storage and playback system of claim 1 wherein the storage means at said common information storage station includes magnetic tape means and pick-up means past which said magnetic tape means is moved at said abnormally high speed, the pick-up means generating electrical signals corresponding to the information magnetically stored on the magnetic tape means; means following the transmission of a complete lesson or program to an information receiving station for returning at a high speed the tape means at the common information storage station to a reference position where it is in position quickly to transmit the same or different lesson or program to another information receiving station requesting the same; said recording and playback means at each information receiving station comprising a magnetic tape recorder having a magnetic tape, recording and pick-up means for respectively recording on the magnetic tape signals received thereby and for generating electrical signals corresponding to the information magnetically stored on the magnetic tape, and tape driving means for selectively moving the tape at said abnormally high speed for receiving the high speed transmitted information from the magnetic tape means of the common information storage station and moving the tape at the information receiving station involved at a relatively slow speed for playing back the information stored therein.

10. The information storage and playback system of claim 9 wherein there is provided manually operable control means at each information receiving station for effecting the selective rewind and forward winding of the tape thereat, and there is provided inhibiting means for inhibiting operation of the manually operable control means at an information receiving station during transfer of a lesson or program thereto.

11. The information storage and playback system of claim 10 wherein each of said information receiving stations has means for signalling to the user when the tape thereat has been rewound, so that the user knows that the tape is in a position to receive a new lesson or program.

12. The information storage and playback system of claim 9 wherein there is provided means for automatically rewinding the tape at said common storage and information receiving stations at a relatively high speed when a complete program or lesson has been transmitted to a receiving station.

13. The information storage and playback system of claim 12 wherein there is provided memory means for memorizing the lesson or program identified by the operation of the lesson or program identifying means at any information receiving station, said first control means being normally responsive to the lesson or program in the memory means by transferring the lesson or program to the recording means of the information receiving station involved when the tape at said common storage station is in its rewound position.

References Cited

UNITED STATES PATENTS

| | | | |
|---|---|---|---|
| 2,435,879 | 2/1948 | Eilenberger | 179—100.2 |
| 3,166,859 | 1/1965 | Alter | 35—35 |
| 3,199,226 | 8/1965 | Joslow | 35—35 |
| 3,200,516 | 8/1965 | Parker | 35—35 |
| 3,269,033 | 8/1966 | Redfield et al. | 35—35 |
| 3,286,273 | 11/1966 | Von Kohorn | 179—100.2 X |
| 3,315,242 | 4/1967 | Haddad | 179—100.2 X |

TERRELL W. FEARS, *Primary Examiner.*

VINCENT P. CANNEY, *Assistant Examiner.*

U.S. Cl. X.R.

35—35; 179—100.2